United States Patent
Madson

[11] Patent Number: 6,059,339
[45] Date of Patent: May 9, 2000

[54] CANTILEVERLY EXTENDIBLE PLATFORM

[76] Inventor: Hugh Griffith Madson, 11060 32nd St. North, Lake Elmo, Minn. 54853

[21] Appl. No.: 09/055,696

[22] Filed: Apr. 7, 1998

[51] Int. Cl.[7] ........................................................ B62C 1/06
[52] U.S. Cl. .................................... 296/26.01; 296/26.06; 296/26.09; 224/403; 224/404; 414/522
[58] Field of Search ............................ 296/26.01, 26.08, 296/26.09; 224/403, 404; 414/522

[56] References Cited

U.S. PATENT DOCUMENTS

| | | | |
|---|---|---|---|
| 2,284,419 | 5/1942 | Greig | 296/26.09 |
| 2,329,419 | 9/1943 | Reed | 296/23 |
| 2,784,027 | 3/1957 | Temp | 296/26.09 |
| 2,788,137 | 4/1957 | Harkness | 296/26.09 |
| 2,795,363 | 6/1957 | Turner | 224/42.43 |
| 2,852,303 | 9/1958 | Hopson | 296/26.09 |
| 3,726,422 | 4/1973 | Zelin | 296/26.09 |
| 3,887,226 | 6/1975 | Hart | 296/26 |
| 4,133,571 | 1/1979 | Fillios | 296/26.09 |
| 4,685,857 | 8/1987 | Goeser et al. | 296/26 |
| 4,830,242 | 5/1989 | Painter | 296/26.09 |
| 4,950,123 | 8/1990 | Brockhaus | 296/26.09 |
| 4,993,088 | 2/1991 | Chudik | 296/26.09 |
| 5,064,335 | 11/1991 | Bergeron et al. | 296/26.09 |
| 5,127,697 | 7/1992 | St. Marie | 296/26.09 |
| 5,301,765 | 4/1994 | Swanson | 296/26.09 |
| 5,456,511 | 10/1995 | Webber | 296/26.09 |
| 5,491,933 | 2/1996 | Miller et al. | 52/67 |
| 5,513,941 | 5/1996 | Kulas et al. | 296/26.09 |
| 5,564,767 | 10/1996 | Strepek | 296/26.09 |
| 5,586,802 | 12/1996 | Dewald, Jr. et al. | 296/26 |
| 5,649,731 | 7/1997 | Tognetti | 296/26.09 |
| 5,692,792 | 12/1997 | Klar | 296/26 |

*Primary Examiner*—Joseph D. Pape
*Assistant Examiner*—Kiran Patel
*Attorney, Agent, or Firm*—Jacobson & Johnson

[57] ABSTRACT

A kit for making an extendible platform for a pickup box comprising, a set of instructions for assembling an extendible platform which utilizes a bracket for securing it to the bed of a pickup, a pair of tracks having upper and lower rails for securing to the bracket, a set of spacers for holding the tracks in a spaced relationship with one another, a set of rollers mountable to an extendible platform, with the rollers movable along the tracks to enable the extendible platform to be moved in and out of the pickup box, and an extendible platform having a set of rollers mounted thereon for engaging either the top or bottom rails of a pair of tracks mounted in a spaced relationship on the bed of a truck to enable the extendible platform to be cantilevered sufficiently far out of the truck so that at least some of the rollers clear the tailgate while others engage the tailgate enabling the remaining rollers to coact with the track to hold the extendible platform in a horizontal loading position even though one end of the extendible platform is cantilevered over the end of the tailgate of the vehicle.

10 Claims, 4 Drawing Sheets

CANTILEVERLY EXTENDIBLE PLATFORM

FIELD OF THE INVENTION

This invention relates generally to extendible platforms and more particularly to extendible platforms for mounting in the box of a covered pickup to permit a person to load or unload items on the front of the pickup box without having to crawl into the pickup box.

BACKGROUND OF THE INVENTION

Lightweight trucks or pickups having an open box are ideal vehicles for hauling articles to and fro, as the box of the pickup contains a relatively large storage area. In order to protect articles from weather and to prevent the theft of these articles from the open box of the pickup, pickup owners frequently place a cover known as a "topper" over the box of the pickup. The topper provides a closure over the box of the pickup with the topper usually extending upward in height to the top of the cab. The amount of head room beneath the topper is limited, so if a person wants to set an article in the front of the pickup box, he or she must bend over or crawl to move the article to the front of the box as one cannot place articles over the sides of the pickup box when the topper is in place. The present invention provides a kit for making an extendible platform from conventional materials to provide a low-cost extendible platform that enables a person to cantileverly extend a loading surface from the rear of the pickup box to enable articles to be loaded onto the extendible platform and then to slide the platform to the front of the pickup box while using the tailgate of the pickup as a cantilever support.

DESCRIPTION OF THE PRIOR ART

U.S. Pat. No. 5,564,767 discloses a prefabricated extendible drawer mounted in the back of a pickup with a threaded rod for moving the extendible drawer in and out of the vehicle bed.

U.S. Pat. No. 5,692,792 discloses a rear storage compartment that extends beyond the vehicle to provide for extra storage space for articles.

U.S. Pat. No. 5,586,802 discloses a mobile living quarter with a retractable or slide-out room that uses a scissors linkage between the main frame and the retractable room.

U.S. Pat. No. 5,491,933 discloses an expandable room structure for a vehicle, with the expandable room carried by a rack and pinion drive arrangement.

U.S. Pat. No. 5,127,697 discloses an extendible compartment for a van that uses a rack and pinion gear system.

U.S. Pat. No. 4,830,242 discloses a prefabricated extendible drawer requiring ground support wheels to function.

U.S. Pat. No. 3,887,226 discloses a trailer pull-out unit which is hinged.

U.S. Pat. No. 2,795,363 discloses a removable carrier box for an automobile truck that uses extendible and contractable arms to hold the box in position.

U.S. Pat. No. 2,329,419 discloses a vehicle with a track and channel irons to permit the extension of camping articles from a position inside the vehicle to a position outside the vehicle.

SUMMARY OF THE INVENTION

A kit for making an extendible platform for a pickup box comprising a bracket for securing to the bed of a pickup, a pair of tracks having upper and lower rails, a set of spacers for securing and holding the tracks in a spaced relationship, a set of rollers mountable to an extendible platform with the rollers movable along the tracks in such a fashion to enable the extendible platform to be moved in and out of the pickup box, and instructions for assembling the kit and mounting the assembled kit onto a pickup, with the extendible platform having a set of rollers for engaging either the top or bottom rails of a pair of tracks mounted in a spaced relationship on the bed of a truck to enable the extendible platform to be cantilevered sufficiently far out of the truck so that at least some of the rollers clear the tail gate while others engage the tailgate thereby enabling the remaining rollers to coact with the track to hold the extendible platform in a horizontal position for loading and unloading articles thereon, even though one end of the extendible platform is cantilevered over the end of the tailgate of the vehicle.

DESCRIPTION OF THE PREFERRED EMBODIMENT

Figure 1:
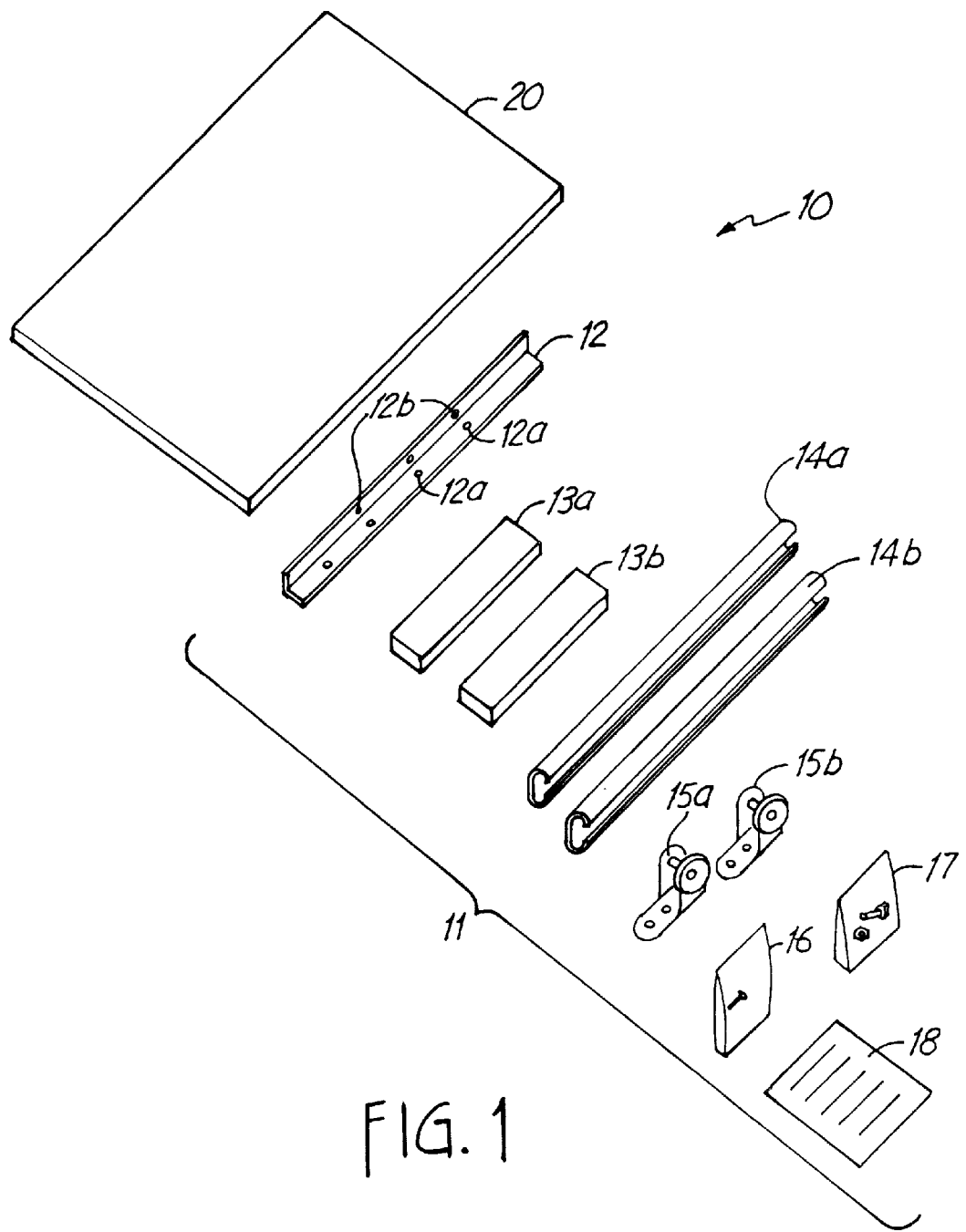
FIG. 1 shows the kit for making a cantileverly extendible platform for mounting in a pickup box.

FIG. 1 shows kit 10 with items that are sold with the kit identified by bracket 11 and a sheet of plywood 20 which can either be sold with the kit or can be purchased to complete the extendible platform for a pickup. Kit 11 includes an angle bracket 12 having a first set of holes therein 12a to enable the fastening of the angle bracket 12 to the bed of the pickup, and a second set of holes 12b for securing a track thereto or for securing the angle bracket to the bed of the pickup box. A set of spaces 13a and 13b are included for maintaining the spacing track 14a and 14b in a parallel relationship to each other. Spacing tracks 14a and 14b are conventional c-shaped garage door tracks that have upper and lower rails to provide for both top and bottom engagement with rollers therein. Also include with kit 11 is a set of eight rollers, two of which are shown as 15a and 15b. The rollers are conventional garage door rollers for rolling mounting in the garage door tracks 14a and 14b and include brackets with flanges for securing the rollers in a rotateable position. In order to assemble the components, a set of instructions 18 is provided that instruct a user to assemble the kit in the following order: 1. Attach the angle bracket 12 to the truck bed, 2. Secure the ends of tracks 14a and 14b to angle bracket 12, 3. Mount the 13a and 13b between the tracks 14a and 14b to maintain the tracks in a spaced relationship; 4. Attach the garage door rollers 15a and 15b to a plywood sheet which becomes an extendible platform 20. Also included with the kit 10, is a bag of wood screws 16 for securing the flanges of the rollers to the plywood sheet 20 and the spacers 13a and 13b to the tracks 14a and 14b, and a bag of bolts 17 for securing the angle bracket 12 to the bed of the pickup.

Figure 2:
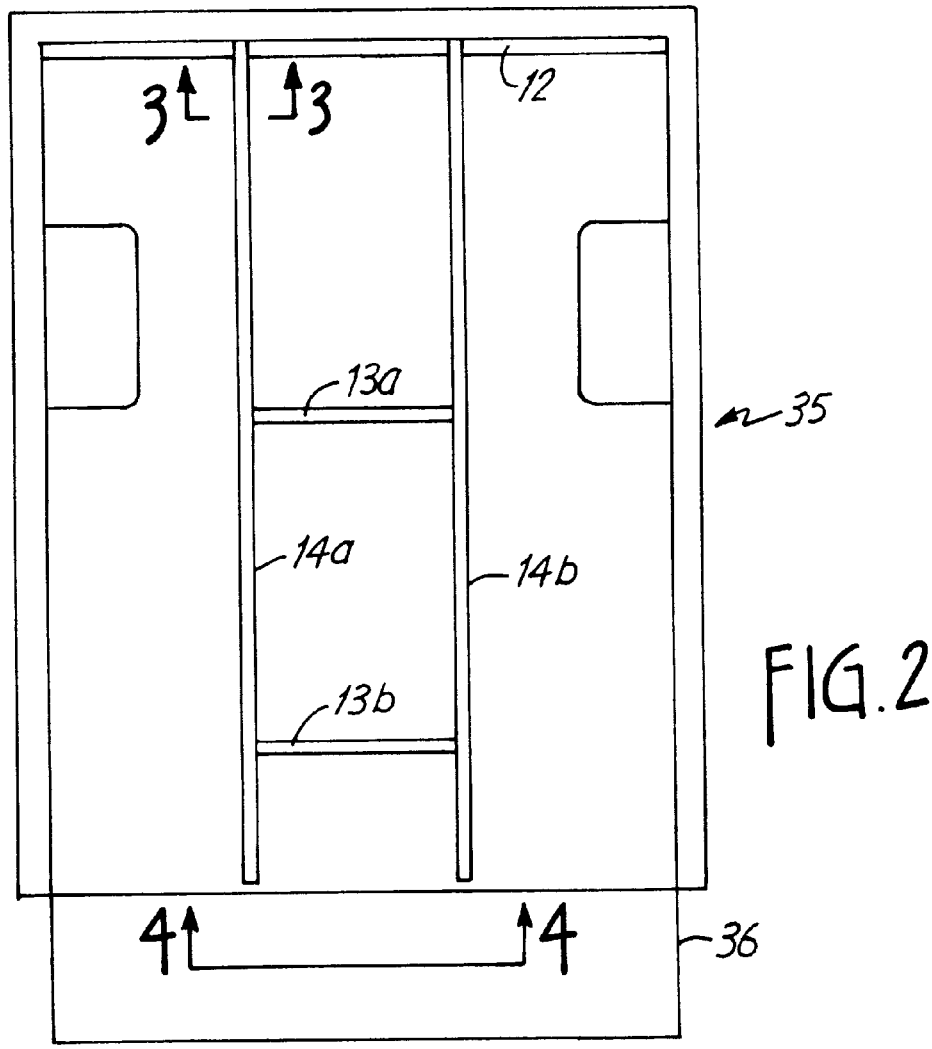
FIG. 2 is a top view of a pickup box with the track system for carrying the extendible platform shown therein.

FIG. 2 is a top view of a pickup box 35 with the tracks 14a and 14b for carrying the extendible platform shown therein. Tracks 14a and 14b each have a first end and a second end, with the first end of the set of tracks securably fastenable to an angle bracket 12 located at the front of the pickup box. The angle bracket 12 is mounted to the bed of the pickup box either through rain holes in the bed, or by drilling holes in the box and extending bolts therethrough. The purpose of mounting the angle bracket 12 to the bottom of the box is to form a support that can be used to anchor the front ends of the tracks to the front of the box so that the front end of tracks of 14a and 14b are affixed to the pickup box. Located between tracks 14a and 14b are a set of spacers 13a and 13b to hold tracks 14a and 14b in a spaced and parallel relationship with one another. The tracks 14a and 14b terminate short of the tailgate 36 (shown in the open position) so that the tailgate 36 can be opened or closed without interfering with the tracks. While an angle bracket 12 that extends across the pickup box 35 is shown, other fasteners could be used to secure the front ends of tracks 14a and 14b to the front of the pickup box.

Figure 3:
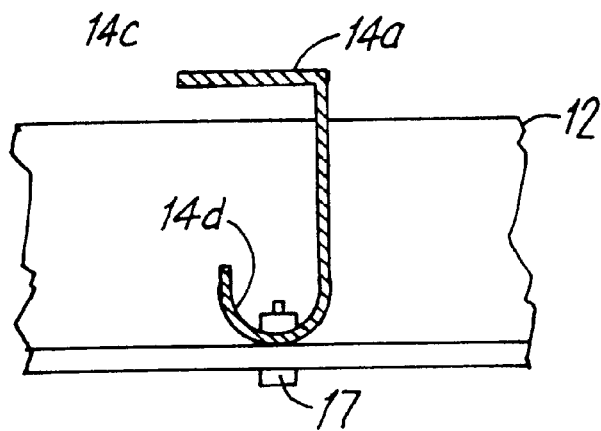
FIG. 3 is a cross-sectional view taken along lines 3—3 of FIG. 2.

FIG. 3 shows a partial sectional view taken along lines 3—3 of FIG. 2 which reveals the track 14a which has an upper rail 14c and a lower rail 14d for rollers to engage therein. A bolt 17 is shown securing the front end of track 14a to angle bracket 12 to hold the track 14a in the upright position shown.

Figure 4:
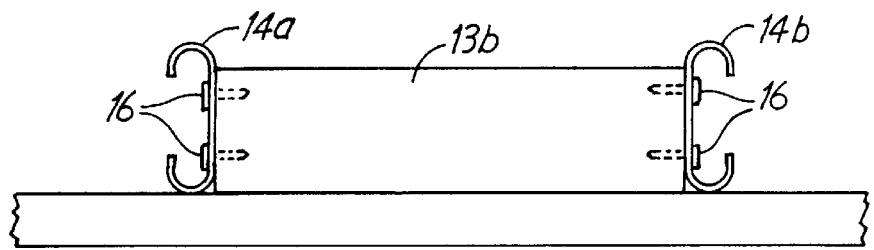
FIG. 4 is an end view ken along lines 4—4 of FIG. 2.

FIG. 4 is an end view taken along lines 4—4 of FIG. 2 and shows the tracks 14a and 14b mounted in a spaced parallel relationship by spacer 13b which is secured to track 14a and 14b by wood screws 16. The screws 16 are sufficiently flush so that a roller can pass along the upper and lower rails of the tracks without engaging the screws 16 extending through the tracks 14a and 14b. Tracks 14a and 14b have the open faces thereon facing outward so that the flat back surface of the tracks can be used for mounting the spacers thereon.

Figure 5:
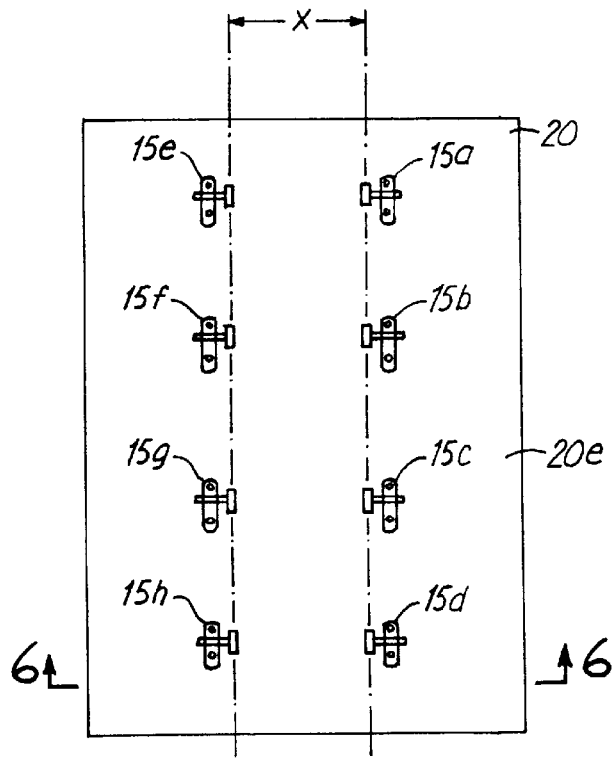
FIG. 5 is a bottom view of the extendible platform with a set of rollers mounted thereon.

FIG. 5 shows a bottom view of an elongated sheet of material which in the preferred embodiment is a sheet of plywood that forms the extendible platform 20 for carrying articles. FIG. 5 shows a bottom view of the extendible platform 20 carrying a first set of rollers 15a, 15b, 15c, and 15d for rollably extending between the upper rails and the lower rails of one of the set of tracks and a second set of rollers 15e, 15f, 15g and 15h for rollably extending between the upper rails and the lower rails of the other of said set of tracks to enable the extendible platform 20 to be rolled thereon. The rollers are located in parallel alignment with each other and are spaced a distance "x" which permits the rollers to move within tracks 14a and 14b.

Figure 6:
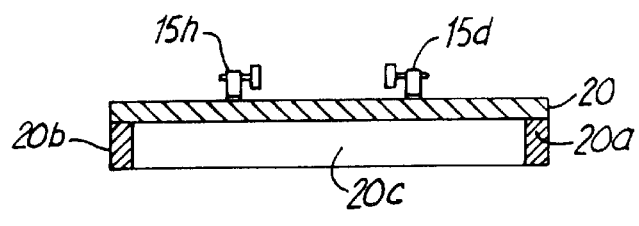
FIG. 6 is a cross-sectional view taken along lines 6—6 of FIG. 5.

FIG. 6 is a cross sectional view taken along lines 6—6 which shows the extendible bed 20 with a reinforcing rib 20a, 20b, and 20c located along the edges of extendible platform 20 to provide stiffness to the extendible platform 20.

A feature of the present invention is that the extendible platform 20 can be cantileverly held by the upper and lower rails of the tracks 14a and 14b even though at least some of the first set of rollers and the second set of rollers are disengaged from the tracks. That is, the upper rails of the tracks prevent upward movement of the rollers, and similarly, the lower rails prevent downward movement of the rollers while still permitting the rollers to move along the tracks.

Figure 7:
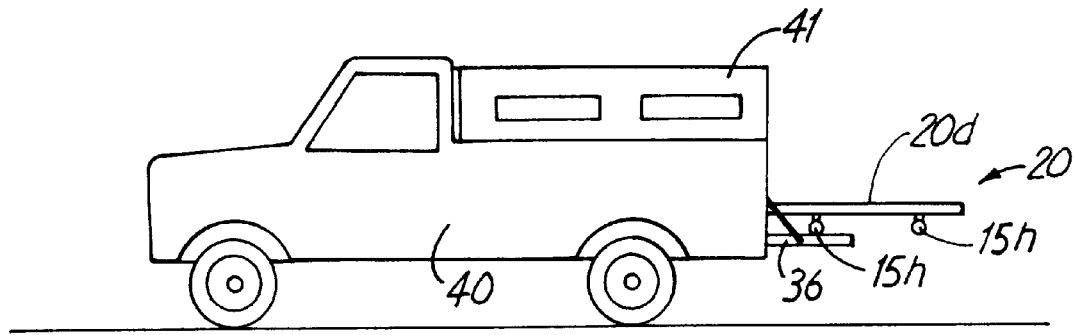
FIG. 7 is a side view of a pickup with my extendible platform cantilevered out of the rear of the pickup box to enable articles to be placed on or removed from the extendible platform.

FIG. 7 is a side view of a pickup 40 with a topper 41 and the extendible platform 20 mounted therein, with the extendible platform 20 extending rearward of the pickup. FIG. 7 shows the roller 15h and its counter part 15d (not shown) are disengaged from the track as is roller 15g and its counter part 15c (not shown) which are resting on tail gage 36. That is, the roller 15g and its counter part 15c engage the tailgate 36 and act as a fulcrum if weight is placed on the cantilevered end of extendible platform 20. However, the use of a track with both upper and lower rails allows the upper rails of the tracks to engage the rollers 15e, 15a, 15f and 15b to prevent the cantilevered end of extendible platform 20 which projects outward of the tailgate 36 from tipping downward. Thus, one can load articles onto surface 20d or remove articles from surface 20d without hindrance by the topper 41.

The extendible platform 20 includes a second surface 20e highlighted in FIG. 5, for carrying a first set of rollers rollably extending between the upper rails and the lower rails of tracks 14a and a second set of rollers rollably extending between the upper rails and the lower rails of track 14b to enable the elongated sheet of materia which forms the extendible platform 20 to be cantileverly held on tacks 14a and 14b (as illustrated in FIG. 7) even though at least some of the first set of rollers and the second set of rollers are disengaged from the tracks.

Figure 8:
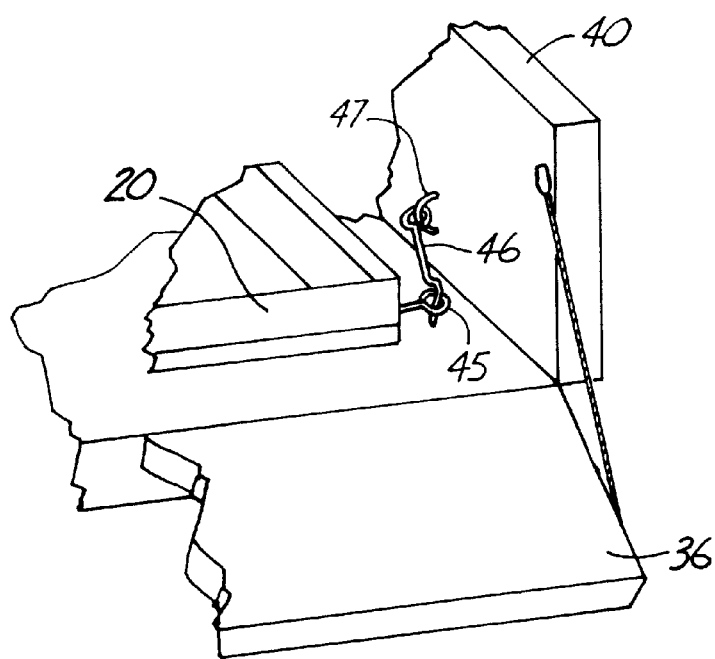
FIG. 8 is a partial perspective view showing the mechanism for holding the extendible platform in the pickup box when the tail gate is opened.

FIG. 8 shows a partial perspective view of extendible platform 20 having an eye 45 extending therefrom for engagement with a hook 46 mounted to truck 40 by a holder 47. Hook 46 holds extendible platform 20 from rolling outward once the tailgate 36 is opened. Hook 46 can be disengaged from eye 45 to allow the extendible platform 20 to be rolled out to the loading or unloading position as illustrated in FIG. 7.

If desired, a set of stops can be located on tracks 14a and 14b to prevent the extendible platform 20 from being accidentally pulled free of engagement with the tracks.

I claim:

1. A kit for building a cantileverly extendible platform for a pickup bed comprising:

a bracket for securing to a bed of a pickup vehicle;

a set of spacers each having a first end and a second end;

a set of metal tracks including a first metal track and a second metal track for securing in a transverse position to the bracket with said first metal track and said second metal track positioned in a parallel relationship, said first metal track and said second metal track each have an open face, with the open face of said first metal track and the open face of the second metal track facing in opposite directions, said first metal track and said second metal track each having a top rail, a bottom rail, and an intermediate section, for securing to said spacers, said spacers postionable between said first metal track and said second metal track to hold said first metal track and said second metal track in a spaced apart condition with the open face of said first metal track and the open face of said second metal track facing outwardly away from said spacers;

a sheet of material for forming an extendible platform;

a set of wheels mountable in a parallel relationship on the sheet of material, said set of wheels mountable in an inward direction to rollably engageable with either the top rail or the bottom rail of the set of metal tracks;

a set of bolts for securing said bracket to a first end of said first metal track and a first end of said second metal track to hold said first metal track and said second metal track in a fixed position relative to said bracket;

a set of screws for securing first metal track to said first end of said spacer and for securing the second metal track to said second end of said spacer to hold said first metal track and said second metal track in a spaced relationship; and a set of instructions for assembling the bracket, said first metal track and said second metal track and the sheet of material into a retractable and extendible platform to facilitate the loading and unloading of articles from the extendible platform.

2. An extendible platform for a vehicle comprising:

a bracket, said bracket securable to a bed of a vehicle;

a first set of rollers and a second set of rollers;

a first track having an open face to form a first outwardly facing track and a second track having an open face to form a second outwardly facing track, said first outwardly facing track and said second outwardly facing track each having upper and lower rails, said first outwardly facing track and said second outwardly facing track each having a first end and a second end, with the first end of said first outwardly facing track and the first end of said second outwardly facing track secured to said bracket to hold said platform in a fixed position, a set of spacers to hold said tracks in a spaced and parallel relationship said spacers having a first end and a second end, said set of spacers mounted between said first track and said second track with said first end of said spacers engaging said first track and said second end of said spacers engaged said second track to hold the open face of said first track in a first outwardly facing direction and the open face of said second track in a second outwardly facing direction opposite from said first outwardly facing direction;

an elongated sheet of material, said elongated sheet of material having a first surface for supporting articles thereon and a second surface for carrying a first set of rollers rollably extending between the upper rails and the lower rails of said first track and said second track, said first set of rollers facing in an inward direction to rollably engage said first outwardly facing track, and a second set of rollers facing in an inward direction to rollably engage the upper rails and the lower rails of the said second outwardly facing track, to enable said elongated sheet of material to be cantileverly held by said set of tracks even though at least some of the first set of rollers and some of the second set of rollers are disengaged from said set of tracks; and a stop to prevent said first set of rollers from becoming completely disengaged with said first outwardly facing track and to prevent said second set of rollers from becoming completely disengaged with said second outwardly facing track.

3. The extendible platform of claim 2 including a reinforcing rib attached to said sheet of material to provide structural reinforcement.

4. The extendible platform of claim 3 wherein the set of tracks are garage door tracks.

5. The extendible platform of claim 4 wherein said bracket comprises an angle bracket securable to a pickup bed and to the set of tracks.

6. The extendible platform of claim 5 wherein the rollers are located on an underside of said extendible platform and the tracks are mounted on top of a bed of a pickup.

7. The extendible platform of claim 6 including an eye and a hook on said vehicle for securing said extendible to said in a non-movable position.

8. The extendible platform of claim 7 wherein the tracks rest on the bed of a pickup box.

9. The extendible platform of claim 8 including at least eight rollers.

10. The extendible platform of claim 9 wherein the extendible platform includes reinforcing ribs for stiffing the extendible platform.

* * * * *